June 14, 1960 A. G. DE CLAIRE, JR., ET AL 2,940,436
FUEL CONTROL FOR AN INTERNAL COMBUSTION ENGINE
Filed March 26, 1956 10 Sheets-Sheet 1

INVENTORS
ALTON G. DE CLAIRE JR. &
BY DONALD J. CAMERON

Walter Patoroka, Sr.
ATTORNEY

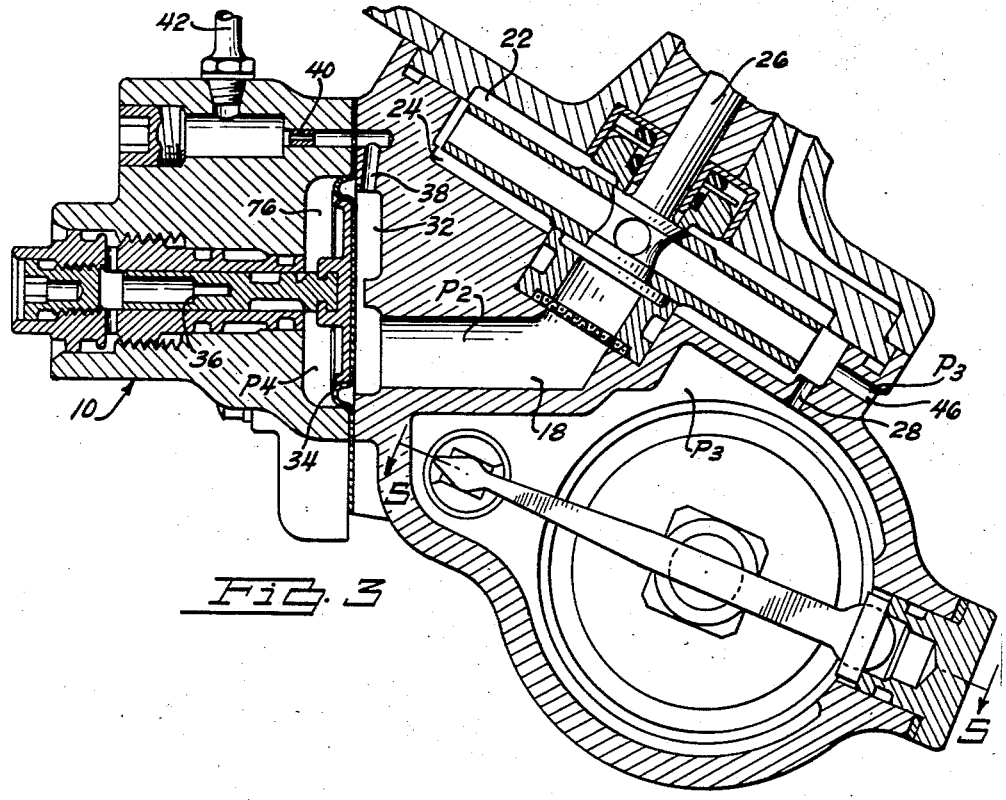
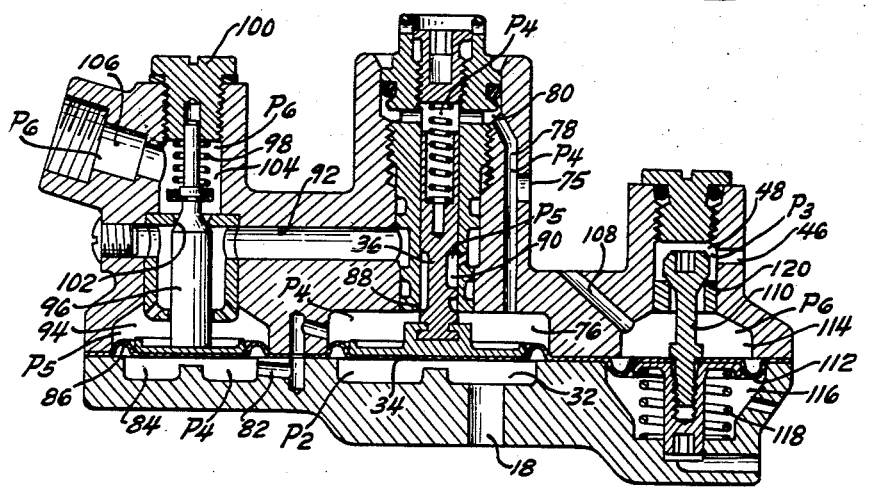

June 14, 1960　　A. G. DE CLAIRE, JR., ET AL　　2,940,436
FUEL CONTROL FOR AN INTERNAL COMBUSTION ENGINE
Filed March 26, 1956　　　　　　　　　　　　　　　10 Sheets-Sheet 3

INVENTORS
ALTON G. DeCLAIRE JR. &
BY DONALD J. CAMERON,

Walter Pataroka, Sr.
ATTORNEY

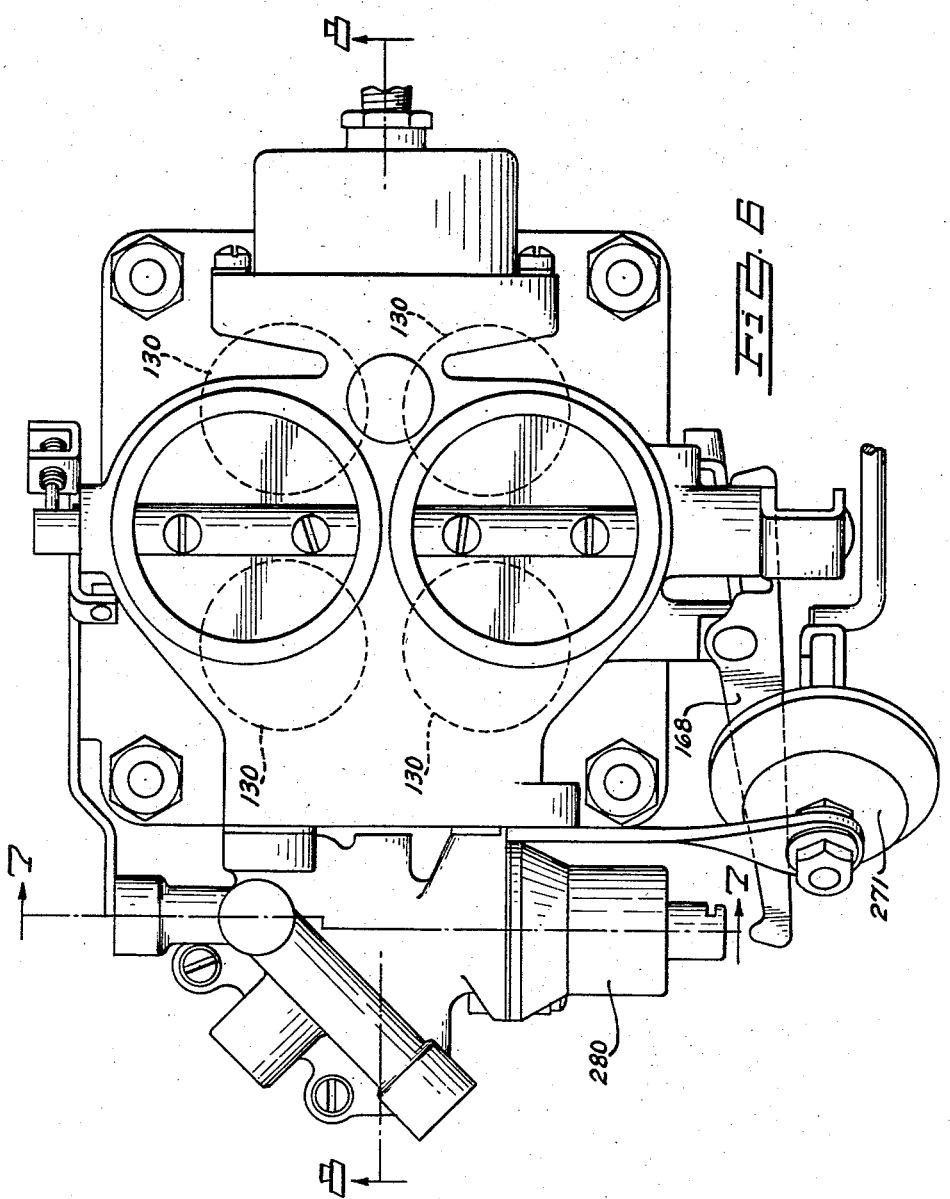

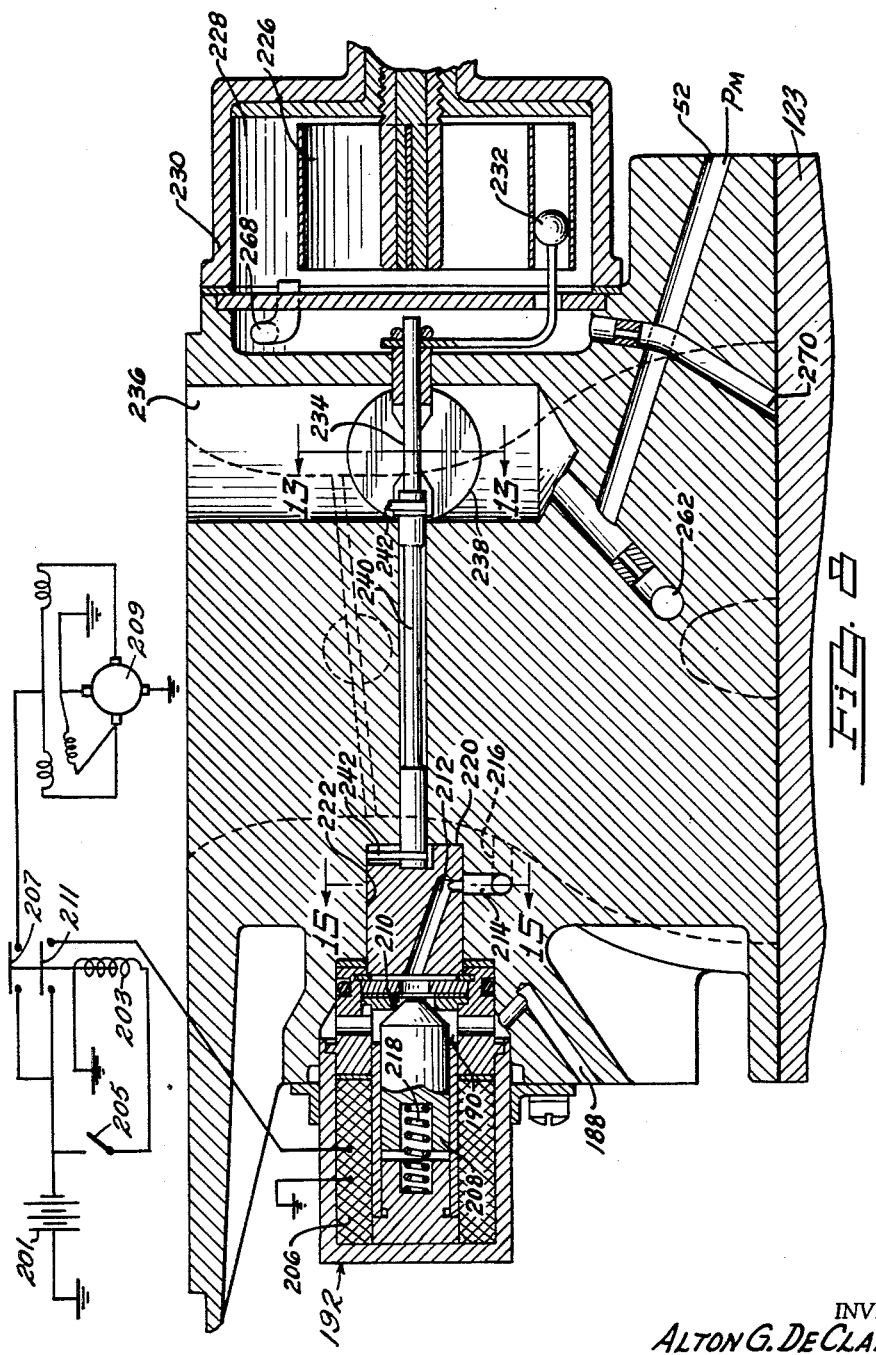

INVENTORS
ALTON G. DE CLAIRE JR. &
BY DONALD J. CAMERON
ATTORNEY

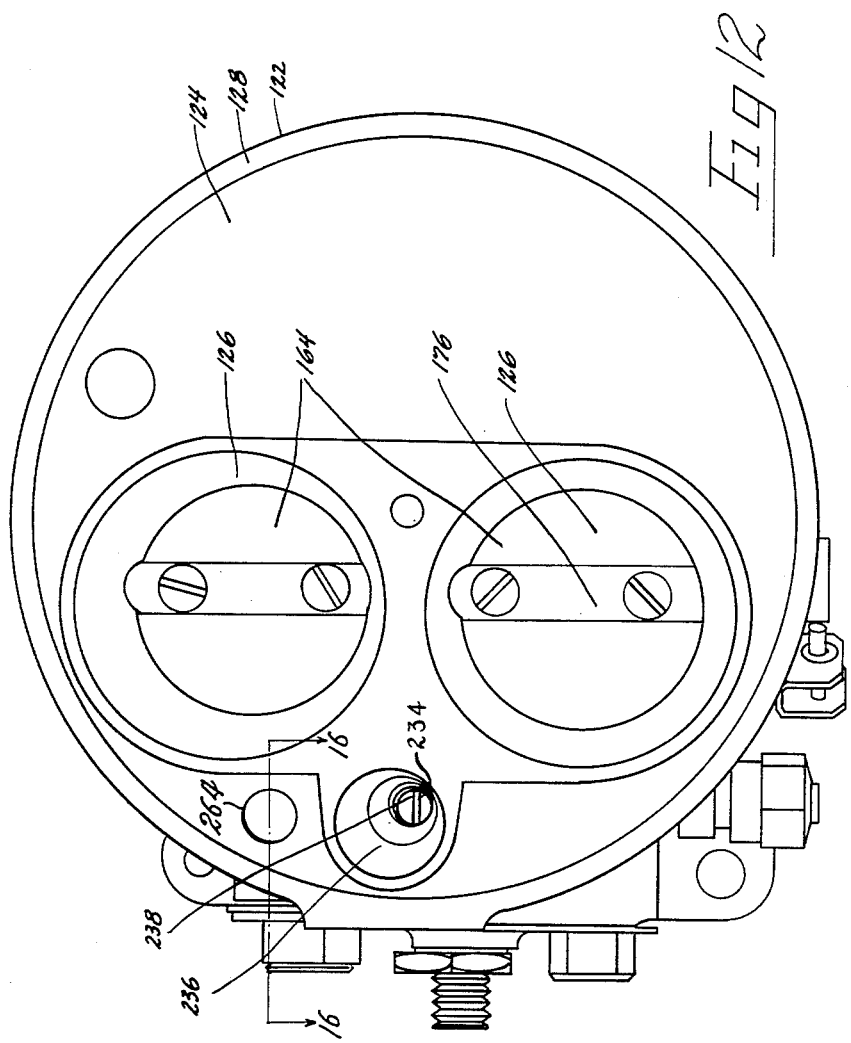

June 14, 1960  A. G. DE CLAIRE, JR., ET AL  2,940,436
FUEL CONTROL FOR AN INTERNAL COMBUSTION ENGINE
Filed March 26, 1956  10 Sheets-Sheet 10

*INVENTORS*
ALTON G. DE CLAIRE JR.
DONALD J. CAMERON
BY

Walter Patoroka, Jr.
ATTORNEY

United States Patent Office 2,940,436
Patented June 14, 1960

2,940,436

FUEL CONTROL FOR AN INTERNAL COMBUSTION ENGINE

Alton G. De Claire, Jr., Harper Woods, and Donald J. Cameron, Roseville, Mich., assignors to Holley Carburetor Company, Van Dyke, Mich., a corporation of Michigan Filed Mar. 26, 1956, Ser. No. 573,925

27 Claims. (Cl. 123—179)

This invention relates to fuel controls, and more particularly to pressure type fuel controls specially adapted for use with internal combustion engines.

While it is common knowledge that certain inherent disadvantages of automotive carburetors can be eliminated by the use of fuel injection devices whereby liquid fuel under positive pressure is supplied to the engine in accordance with engine requirements, the failure of automotive manufacturers to incorporate such devices in their products is the best evidence that an economically practical device is not yet available.

Accordingly, one object of the present invention is to provide a new and improved pressure type fuel control for internal combustion engines.

Another object of the invention is to provide a fuel control of this type which is adapted to be substituted for the carburetor of any engine without requiring extensive redesign of the engine.

Still another object of the invention is to provide a pressure type fuel control which is relatively free of moving parts subject to wear.

Another object of the invention is to provide a fuel control in which liquid fuel under pressure is first supplied according to engine speed and manifold vacuum or other parameters which are proportional to air flow to the engine and then divided and injected into the engine or engine intake manifold under a constant predetermined pressure.

A further object of the invention is to provide a fuel control having a single metering system to supply liquid fuel under pressure for engine speeds at idle and above, a separate metering system to provide liquid fuel under pressure at starting.

A still further object of the invention is to provide a control having means sensitive to engine temperature for admitting varying quantities of fast idle air and/or starting fuel to said engine.

These and other objects of the invention will become more apparent by reference to the following specification, including the attached drawings wherein:

Fig. 3 is a cross-sectional view taken on the plane of line 3—3 of Fig. 2, looking in the direction of the arrows.

Fig. 4 is a cross-sectional view taken on the plane of line 4—4 of Fig. 2, looking in the direction of the arrows.

Fig. 6 is a top plan view of the throttle body shown diagrammatically by Fig. 1.

Fig. 8 is a cross-sectional view taken on the plane of line 8—8 of Fig. 6, looking in the direction of the arrows.

Fig. 12 is a fragmentary top plan view illustrating the right-hand portion of Fig. 6 in greater detail.

Figure 1:
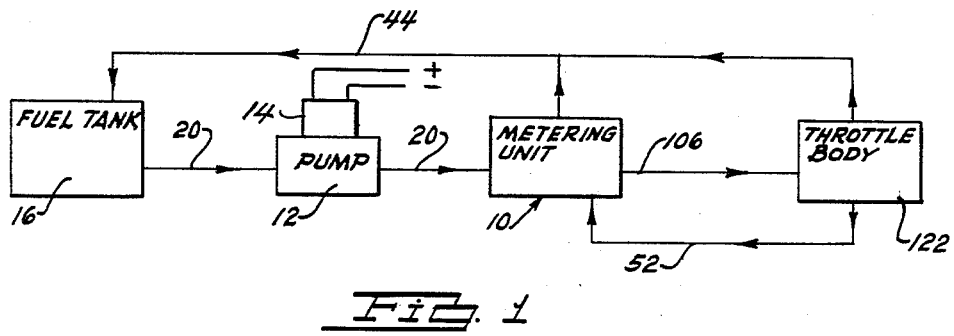
Fig. 1 is a diagrammatic view illustrating the relationship of the various elements of a device embodying the invention.
Figure 2:
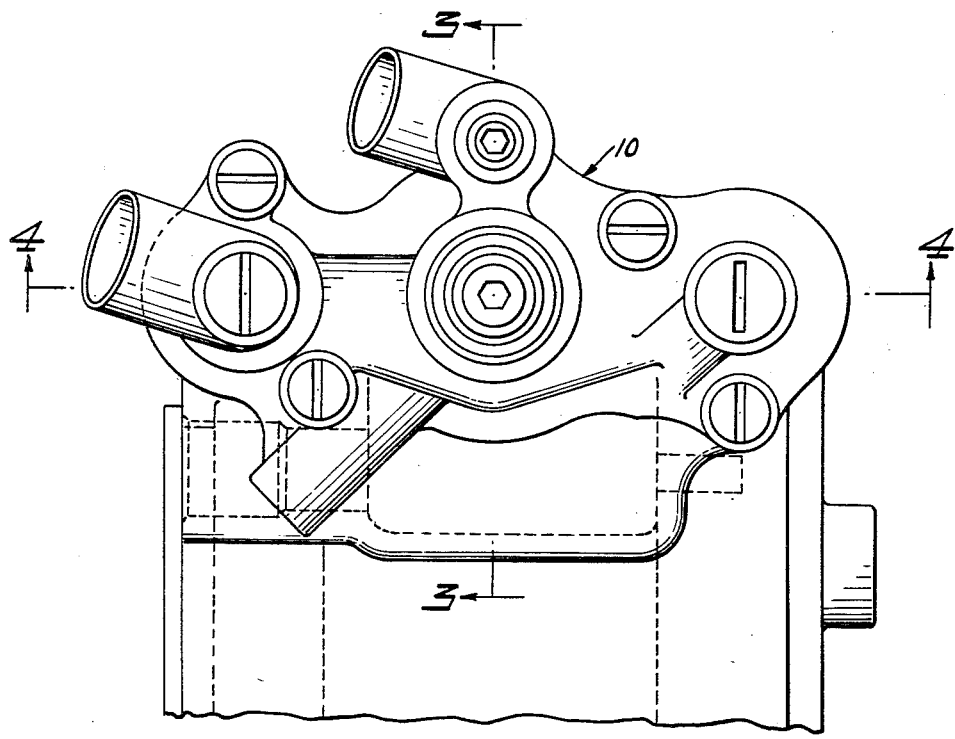
Fig. 2 is a top plan view of the metering unit shown diagrammatically by Fig. 1.
Figure 5:
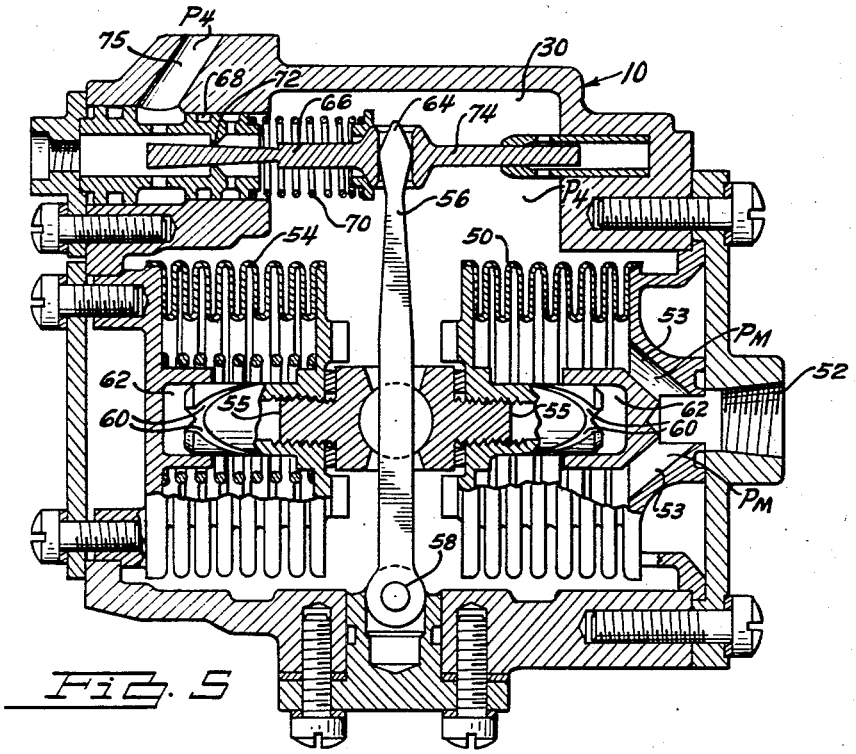
Fig. 5 is a cross-sectional view taken on the plane of line 5—5 of Fig. 3, looking in the direction of the arrows.
Figure 7:
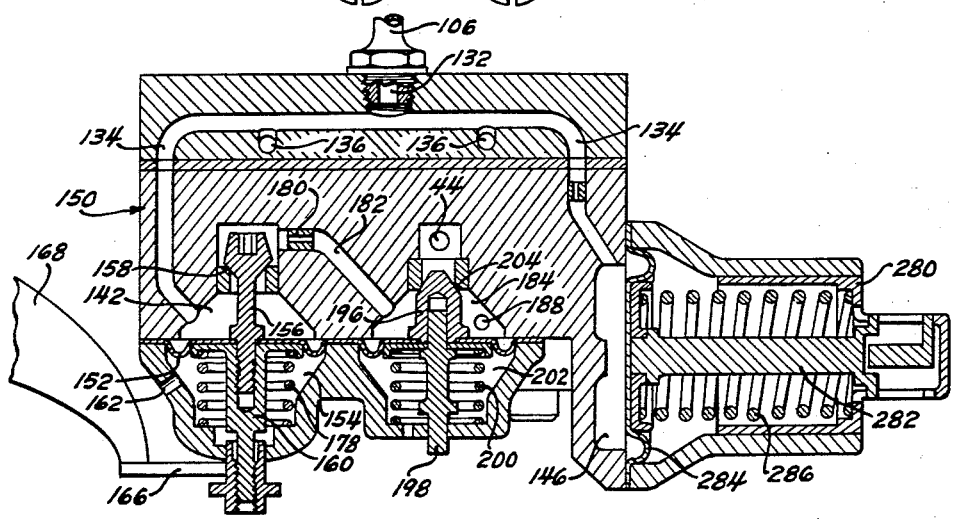
Fig. 7 is a cross-sectional view taken on the plane of line 7—7 of Fig. 6, looking in the direction of the arrows.
Figure 9:
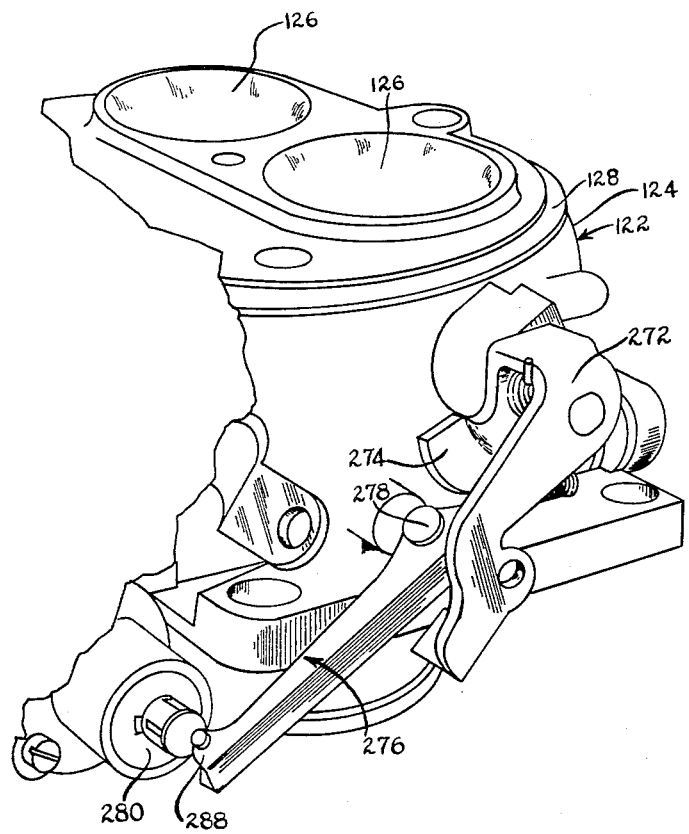
Fig. 9 is a fragmentary perspective view of the throttle body shown by Fig. 6.
Figure 10:
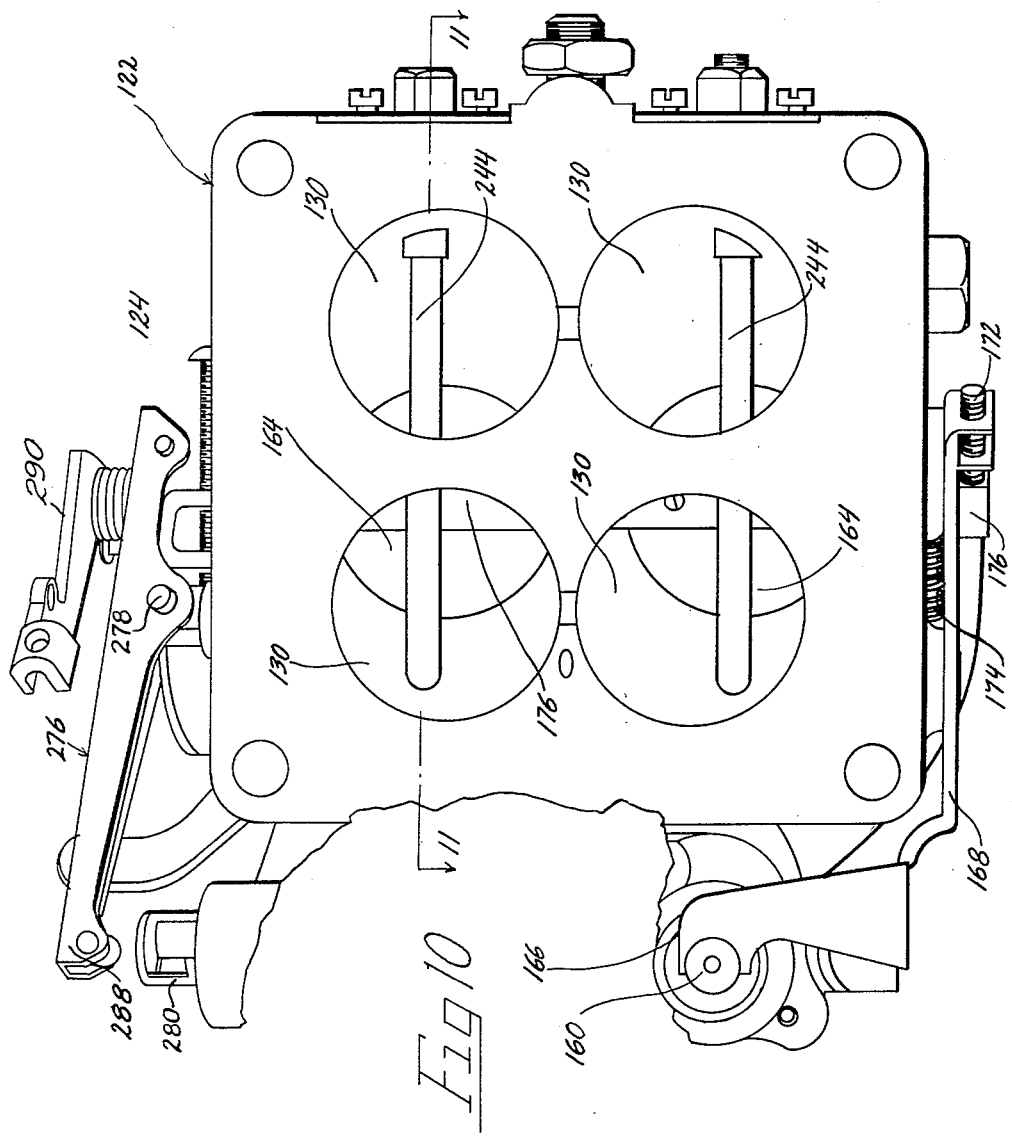
Fig. 10 is a fragmentary bottom plan view of the throttle body shown by Fig. 6.
Figure 11:
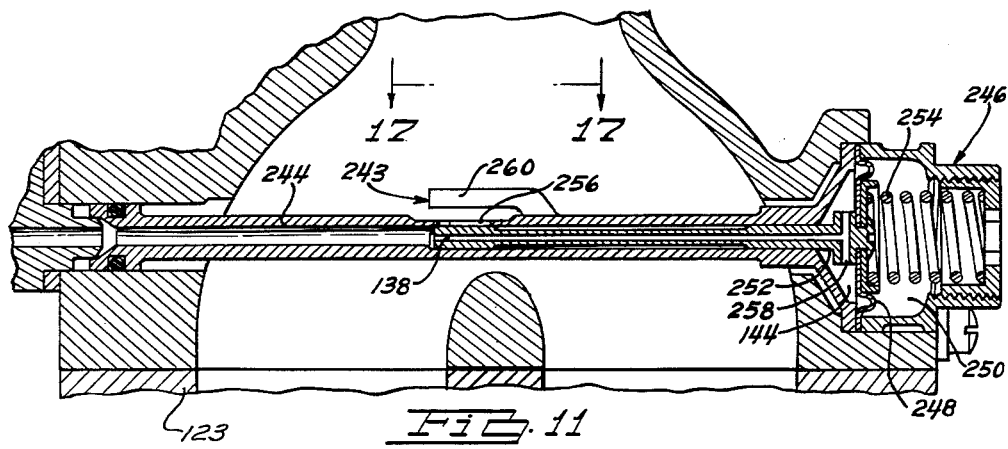
Fig. 11 is a cross-sectional view taken on the plane of line 11—11 of Fig. 10, looking in the direction of the arrows.
Figure 16:
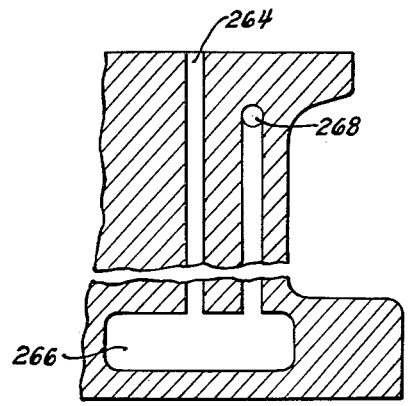
Fig. 16 is a fragmentary cross-sectional view taken on the plane of line 16—16 of Fig. 12, looking in the direction of the arrows.
Figure 17:
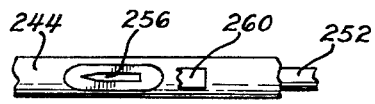
Fig. 17 is a fragmentary top plan view of a portion of Fig. 11, looking in the direction of the arrows.
Figure 13:
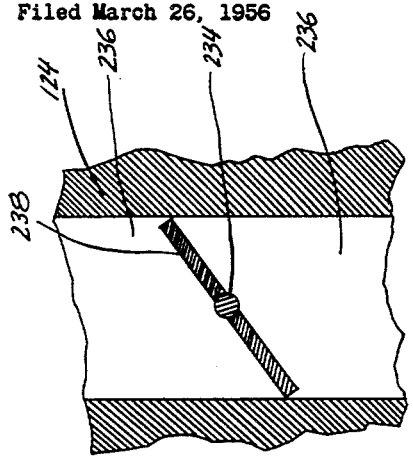
Fig. 13 is a fragmentary cross-sectional view taken on the plane of line 13—13 of Fig. 8, looking in the direction of the arrows.

Referring to the drawings in greater detail, Figs. 1–5 illustrate diagrammatically a device 10 for supplying liquid fuel under pressure in accordance with engine requirements, as sensed by a combination of engine speed and intake manifold pressure. The device 10 includes a constant velocity pump 12 driven by a motor 14 connected in the engine ignition circuit and adapted to pump liquid fuel under a pressure P2 from the tank 16 (Pressure=P1) to the chamber 18 through the conduits 20 when the ignition circuit is closed.

The details of construction of the motor 14 and the pump 12 are not elaborated upon since they are not material to the invention. Similarly, while the device 10 about to be described in greater detail supplies fuel in accordance with engine speed and manifold pressure, it is to be understood that for purposes of this invention any other device adapted to supply liquid fuel under pressure in accordance with the engine requirements (preferably in quantities proportional to air flow to the engine) may be substituted therefor.

The device 10 is formed to provide a hollow vane type centrifugal pump 22 which rotates in accordance with engine speed within chamber 24 by reason of its being coupled to shaft 26 which is itself driven in accordance with engine speed. It will be apparent that the rotation of pump 22 creates a pressure differential between the chamber 18 and the conduit 28 leading to chamber 30, the pressure (P3) in conduit 28 and chamber 30 being greater than that (P2) in chamber 18 and the differential (P3−P2) depending upon the speed of the engine. This relationship may be expressed by the formula $$P3-P2=K_1N^2$$

where N represents engine speed and K is a constant.

In lieu of the pump 22, any other equivalent device responsive to engine speed to create the above pressure differential may be employed.

It will be observed that the pressure P2 also exists in the chamber 32 of which diaphragm 34 having valve 36 attached thereto forms one wall, as well as in conduit 38 having the fixed restriction 40 which permits a predetermined amount of fuel to return to the tank 16 through the conduits 42 and 44.

Likewise, pressure P3 also exists in conduit 46 and chamber 48.

Engine intake manifold pressure Pm is continuously admitted to the otherwise sealed bellows 50 through the conduit 52 and passages 53. Thus, the bellows 50 continuously acts together with sealed and evacuated bellows 54 through the stems 55 in rotating the arm 56 about the pivot 58 according to absolute engine manifold pressure Pm. The passages 60 vent the guide chambers 62 for the stems 55. The free end 64 of the arm 56 causes the valve 66 having the contoured metering portion 68 to slide axially against the tension of spring 70 and to thus vary the orifice 72 in accordance with manifold pressure Pm.

The spring 70 and the stem 74 which acts as a hydraulic dashpot, assure constant contact between the free end 64 of arm 56 and the valve 66.

It is apparent that any suitable equivalent means could be substituted for the above manifold pressure responsive device.

From the metering orifice 72, fuel at P4 pressure passes through conduit 75 into the chamber 76 on the opposite side of diaphragm 34, through conduit 78 to the chamber 80 formed by the cylinder in which valve 36 is guided and through conduit 82 to the chamber 84 of which flexible diaphragm 86 forms a wall.

Thus, whenever pressure P4 exceeds pressure P2, the diaphragm 34 and the valve 36 will be displaced toward chamber 32 to open orifice 88 and permit fuel to flow at pressure P5 through chamber 90 and conduit 92 and into chamber 94 of which diaphragm 86 forms a wall. Whenever P2 is greater than P4, valve 36 will move to close orifice 88. In other words, valve 36 moves in either direction to adjust P4 to equal P2.

Valve 96 which is secured to diaphragm 86 likewise moves in either direction until P4—P5 is equal to the force of the spring 98 which may be adjusted by means of the screw 100. In other words P4—P5 is kept at a constant value because whenever the combined forces of P5 and the spring 98 exceed the force of P4 on diaphragm 86, the valve 96 will be moved to open orifice 102 and permit fuel at a pressure P6 to flow into chamber 104 and into conduit 106 which carries metered fuel to the portion of the control shown by Figs 6–17.

If the fuel pressure in chamber 76 is designated P4, then $$P3-P4=\frac{K_2 W_f^2}{A^2}$$

where K is a constant, A is the area of the orifice 72 and $W_f$ is fuel flow through orifice 72.

Since $$A=K_3 Pm, \quad W_f^2=\frac{K_1 K_3^2}{K_2}Pm^2 N^2 \text{ or } W_f=\sqrt{\frac{K_1 K_3^2}{K_2}}PmN$$

In other words, fuel flow through orifice 72 (and line 108) is proportional to manifold pressure and engine speed, which in turn are proportional to air flow to the engine. Thus, the device 10 supplies liquid fuel under pressure to line 106 in quantities proportional to air flow to the engine.

Valve 110 is secured to flexible diaphragm 112 which separates chambers 114 and 116, the latter of which is vented to atmosphere and contains the spring 118 which normally urges valve 110 upwardly to open orifice 120.

The only purpose for valve 110 is to fill the line 106 with fuel through the line 108 in the event that valve 36 is closed by pressure P2 when the ignition circuit is first closed. The spring 118 holds valve 110 open until the force of pressure P6, which is transmitted back through lines 106 and 108 to chamber 114, on diaphragm 112 overcomes the force of spring 118.

The device 122 shown by Figures 1 and 6–17 has the purpose of adapting the proposed fuel control to the existing manifold system 123 of any engine and includes means for properly distributing the fuel supplied by the device 10 shown by Figs 1–5 under all conditions of engine operation to provide a complete fuel control that may be easily substituted for the carburetor without the necessity of redesigning any parts of the engine.

The device 122 includes a body 124 having a pair of inlet passages 126 for supplying combustion air to the engine through an air filter which may be mounted on the flange 128. Each intake passage 126 is formed to branch off into two separate passages 130 so that the underside of the body 126 provides the equivalent of the bottom of a four-barrel carburetor. With this construction of the body 124, it can be seen that the usual four-barrel carburetor may be removed from any engine and the body 124 may be substituted therefor in converting the engine from a carburetor fuel system to a pressure fuel system. A four-barrel installation is shown for purposes of illustration only. It is to be understood that the invention is not limited in any way in its application to a particular engine or manifold construction, but it is easily adapted to any engne structure.

The metered fuel from the device 10 passes through the line 106 and enters the device 122 at 132 to fill the lines 134, 136, 138 and the chambers 142, 144 and 146.

The valve assembly 150 includes a housing divided by a flexible diaphragm 152 into chambers 142 and 154. The valve 156, which is secured to the center of the diaphragm 152, passes through the chamber 142 and is adapted to seal the orifice 158. A stem 160, which is also secured to the center of the diaphragm 152, passes through the chamber 154 which is subjected to manifold pressure by reason of its connecticon through passage 162 to the intake passage 126 below the throttle plate 164. The end of the stem 160 is enlarged to provide a one-way connection with the forked end 166 of the lever 168 which is pivoted at 170 and whose opposite end 172 is adapted to be depressed against the force of the spring 174 by rotation of the throttle plate shaft 176.

When the ignition circuit is closed so that the device 10 is supplying fuel and before the engine is started, the throttle plate 164 is closed and the end 172 of lever 168 is therefore depressed against the force of the spring 174 in a manner so that the forked end 166 of the lever does not engage the enlarged end of the stem 160. In such event, it will be apparent that since there is no manifold vacuum acting on the diaphragm 152 the spring 178 will urge the diaphragm 152 and the valve 156 upwardly so that the orifice 158 is open. Metered fuel in line 134 thus passes through the chamber 142, the orifice 158, the fixed restriction 180, through the line 182 to the chamber 184 in valve assembly 186 and then through the line 188 to chamber 190 in solenoid valve asesmbly 192.

The valve assembly 186, which includes a housing, the diaphragm 194, a valve 196 and a stem 198 connected to the center of the diaphragm at opposite sides thereof and a spring 200 in the vented chamber 202 urging the valve 196 to a closed position, merely maintains the pressure in line 188 and chamber 190 at a constant predetermined value, preferably about 2 p.s.i.

The force of the spring 200 is such that whenever the pressure in chamber 184 exceeds the desired pressure, the diaphragm 194 is urged against the force of the spring 200 to open the orifice 204 and vent fuel back to the tank 16 through line 44.

Any engine on which the device 10 may be employed would of course have the usual engine starting circuits well known to those skilled in the art, comprising a grounded battery 201 and a starter relay 203 energized by a starter switch 205. The relay 203 includes a first contact 207 for connecting the battery to the grounded starter motor 209 and in this instance, a second contact 211 for connecting the battery to the grounded solenoid winding 206 when the switch 205 is closed manually. Obviously, the starter motor is connected to the engine.

It will thus be noted that the solenoid winding 206 in the solenoid valve assembly 192 is connected in the starter circuit so that the solenoid is energized only while the starter circuit is closed. During the starting period, the valve 208 is drawn into the solenoid, thus opening the orifice 210 and permitting the fuel in chamber 190 to pass into the passage 212 and ultimately through the passages 214 and 216 in the body 124 and thence into the intake passages 130. It is apparent that as soon as the starter circuit is open, the solenoid winding 206 will be de-energized and the spring 218 will force the valve 208 out of the solenoid to close the orifice 210 and prevent the flow of fuel therethrough.

The above solenoid valve thus provides fuel at a given pressure during starting only. However, an engine may be started either hot or cold, and less fuel is required during hot starting than during cold starting in order to prevent flooding.

Figure 15:
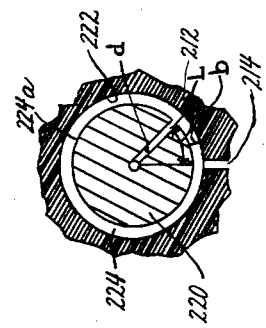
Fig. 15 is a fragmentary cross-sectional view taken on the plane of line 15—15 of Fig. 8, looking in the direction of the arrows.
Figure 14:
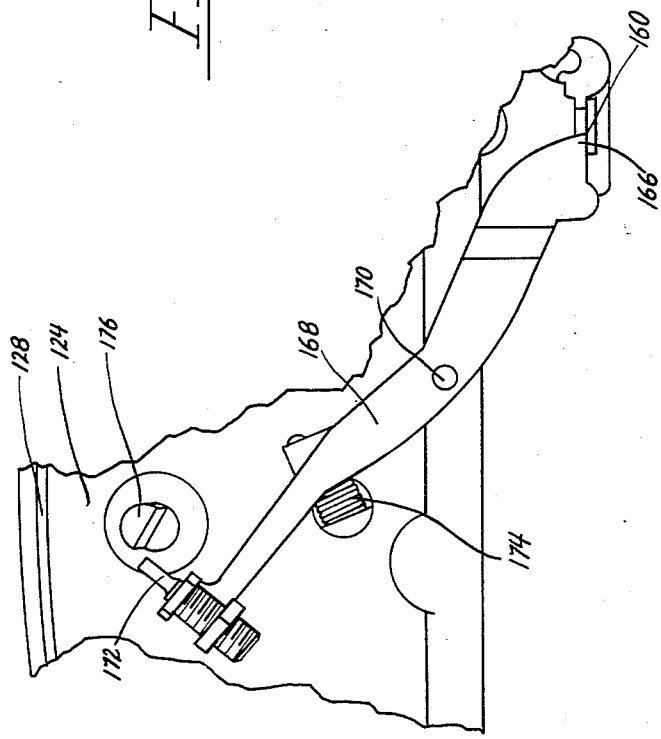
Fig. 14 is a fragmentary side elevational view of the throttle body shown by Fig. 6.

This is accomplished by means of a rotating valve 220 seated with suitable clearance in a cylinder 222 so that fuel from passage 212 must flow through the clearance 224 between the valve 220 and the cylinder 222 to reach the passage 214 as shown diagrammatically by Fig. 15.

It is preferred that the clearance 224 be such that while fuel can flow completely around valve 220, sufficient frictional resistance is offered to such flow so that the flow through the variable shorter leak path 224a controls the amount of flow from passage 212 to passage 214.

Valve 220 is rotated to adjust the controlling leak path 224a between the passage 212 and the passage 214 in accordance with engine temperature by means of a thermostatic coil 226 located in chamber 228 provided by the housing 230. As it winds up or unwinds according to engine temperature, the outer end of the thermostatic coil 226 rotates the lever 232 which is connected to a shaft 234 having mounted thereon within the passage 236, a butterfly type valve 238, the purpose of which is described below. A shaft 240 having a radially extending lug 242 at each end thereof to rotatably engage the shaft 234 and the valve 220 transmits rotary motion of the shaft 234 to the valve 220. From the applicable formula $$W_t = \frac{Kb^3d}{L}$$

wherein $W_t$ is fuel flow, $b$ is the clearance 224, $d$ is the width of passage 212 and $L$ is the length of leak path 224a, it is apparent that as the leak path 224a is lengthened by the action of the thermostatic spring 226 as the engine is warmed up, less fuel will flow through the leak path 224a than when the engine is cold and the leak path 224a is short. Actually, the arrangement is preferably such that the passages 212 and 214 are in communication when the engine is cold, and displaced a maximum of about 60° when the engine is warm.

When the engine starts, the manifold vacuum immediately increases so that the diaphragm 152 is displaced against the force of spring 178 in a direction to cause the valve 156 to close orifice 158. This causes an increase in the fuel pressure in the chamber 142 which also results in closing of the valve 156. Also the starter circuit is opened so that the solenoid 206 is de-energized and the valve 208 is closed as explained above. Thus, no fuel is permitted to flow through the restriction 180 and into the line 182. The closing of the valve 156 and the other results thereof occur rapidly, as does the consequent build-up of fuel pressure in the lines 136 and 138 and the chambers 144.

The fuel nozzle assembly 243 comprises a tube 244 extending across the intake passage 126 on the engine side of the throttle plate 164. One end of the tube communicates with line 136 and the opposite end of the tube terminates in a valve assembly 246 comprising a housing, a flexible diaphragm 248 dividing the housing into chambers 144 and 250, the latter of which has vented to atmosphere. An inner tube or hollow needle valve 252 is connected to the center of the flexible diaphragm 248 so that it is normally urged by the spring 254 in the chamber 250 against the pressure of the fuel in chamber 144 in order to close the nozzle opening 256 in the outer tube 244. Fuel enters the chamber 144 through the passage 138 and the passages 258. As the fuel pressure in chamber 144 increases to a predetermined value determined by the force of the spring 254, the diaphragm 248 and the needle valve 252 are moved to open the nozzle 256 so that a jet of fuel is directed upwardly against the baffle member 260 secured to the outer tube directly above the nozzle.

It is apparent that the nozzle assembly 242 and the throttle valve 164 is provided in each of the intake passages 126. Thus, the nozzle 256 in each of the inlet passages supplies fuel to the engine at all conditions of engine operation except starting and the amount of fuel discharged is proportional to the air flow through the intake passages. This is true since the device controls flow of fuel in accordance with engine speed and manifold vacuum which are themselves proportional to air flow.

It is further apparent that whenever the throttle plates 164 are held open, the spring 174 will exert a force on the lever 168 causing the lever to rotate about the pivot 170 so that the forked end 166 of the lever will hold the stem 160, and thus the valve 156, in a position to close the orifice 158 to flow of metered fuel, regardless of fuel pressure and manifold vacuum.

After the engine is started and while it is still cold, it is desirable to operate the engine at a fast idle, which requires additional air to be admitted to the engine. This is accomplished by means of the butterfly valve 238 attached to the shaft 234 and actuated by the thermostatic spring 226. Clean air from the air filter is drawn through the passage 236 and the passages 262 to the branch inlet passages 130 whenever the butterfly valve 238 is open. The thermostatic spring 226 is made in such a way so that during cold starting it not only permits maximum starting fuel to flow to the engine, but also permits fast idle air to flow through passage 236. When the engine is hot, the action of the thermostatic spring 226 not only reduces the amount of starting fuel but it also reduces or cuts off the fast idle air. While the spring 226 controls both the starting fuel and the air, the control of the air is a gradual control, while the starting fuel is shut off completely as soon as the starter circuit is opened.

The thermostatic spring 226 is heated by means of filtered air which is drawn through the passage 264, the stove chamber 266 preferably located in the exhaust manifold, the passage 268, the thermostatic spring chamber 228 and out the passage 270.

The fast idle air pressure in the passage 236 below the butterfly valve 238 is higher than manifold pressure when the butterfly valve is open at cold idle, and equal to manifold pressure when the butterfly valve is closed at hot idle. This makes the metered fuel flow greater at cold idle than at hot idle.

The throttle plate shaft 176 is provided with a manual throttle lever 272 having the usual dashpot 271 and a cam 274 formed thereon. A lever 276 pivoted at 278 has one end thereof engaging the cam 274 and the other end thereof engaging the outer end of a spring loaded piston 280 having a stem 282, the other end of which is secured to the center of a flexible diaphragm 284 engaging one end of the spring 286. Whenever the throttle lever 272 is rotated to open the throttle plates 164, the cam 274 causes the lever 276 to pivot so that the end 288 of the lever forces the piston 280 toward the diaphragm 284. This loads the spring 286 which then displaces the diaphragm 284 into the chamber 146 so that additional acceleration fuel is forced through the nozzles 256 at a rate depending upon the force of the spring 286 and for a duration depending upon the displacement of the diaphragm 284 by the spring 286. When the throttle linkage 290 is released to close the throttle plates 164, the spring 286 and the fuel pressure in line 134 are free to force the piston 280 outwardly so that the chamber 146 may be refilled with fuel.

The drawings and the foregoing specification constitute a description of the improved fuel control in such full, clear, concise and exact terms as to enable any person skilled in the art to practice the invention, the scope of which is indicated by the appended claims.

What is claimed is:

1. In a fuel supply system for a spark ignited internal combustion engine having an intake manifold and an engine starting circuit, a fuel control device adapted to supply fuel to said engine, said device comprising a body member adapting said device to said manifold and having an intake passage and a throttle plate therein, means operatively connected to said starting circuit and including thermostatically controlled means sensitive to engine temperature for supplying varying quantities of starting fuel to said engine only when said starting circuit is closed, and separate means for supplying fuel at all engine speeds after the engine has started, said separate means including means adapted to supply fuel in quantities proportional to air admitted to the engine.

2. In a fuel supply system for a spark ignited internal combustion engine having an intake manifold and an engine starting circuit, a fuel control adapted to supply fuel to said engine, said control including a starting fuel supply system, said starting fuel system being operatively connected to said starting circuit and including thermostatically controlled valve means sensitive to engine temperature for supplying varying quantities of starting fuel to said engine only when said circuit is closed, and a separate system for supplying fuel at all engine speeds after the engine has started, said separate system including means adapted to supply fuel in accordance with engine speed and manifold pressure.

3. In a fuel supply system for a spark ignited internal combustion engine having an intake manifold and an engine starting circuit, a fuel control adapted to supply fuel to said engine, said control including a throttle body adapting said control to said manifold and having an intake passage and a throttle plate therein, means connected to said circuit solely for the purpose of supplying starting fuel to said engine when said circuit is energized said means including thermostatically controlled valve means sensitive to engine temperature for varying the quantity of starting fuel supplied to said engine in accordance with engine starting temperature and solenoid valve means connected in said starting circuit for positively cutting off said starting fuel when said engine has started and said circuit is open, and separate means for supplying fuel at all engine speeds after the engine has started, said separate means being adapted to supply fuel in accordance with air admitted to the engine.

4. A fuel supply system for a spark ignited internal combustion engine having an intake manifold and engine ignition and starting circuits, comprising a fuel storage tank, an electric pump connected in said ignition circuit for pumping fuel from said tank, and a fuel control adapted to receive fuel from said pump and to supply said fuel to said engine, said control including a system solely for the purpose of supplying starting fuel to said engine, said starting fuel system including thermostatically controlled valve means sensitive to engine temperature for supplying varying quantities of said starting fuel in accordance with engine starting temperature and solenoid valve means connected in said starting circuit for positively cutting off said starting fuel when said engine has started and said circuit is open, said starting fuel system having means for venting said starting fuel back to said tank to regulate the pressure thereof, and a separate system for supplying fuel at all engine speeds after the engine has started, said separate system including means adapted to supply fuel in accordance with air admitted to the engine.

5. A fuel supply system for a spark ignited internal combustion engine having an intake manifold and engine ignition and starting circuits, comprising a fuel storage tank, an electric pump connected in said ignition circuit for pumping fuel from said tank and a fuel control adapted to receive fuel from said pump and to supply said fuel to said engine, said control including a throttle body adapting said control to said manifold and having an intake passage and a valve therein, a first fuel supply system operative to supply fuel to said engine only when said starting circuit is closed, said first system including thermostatically controlled valve means sensitive to engine temperature for supplying varying quantities of starting fuel to said engine depending upon engine starting temperature, solenoid valve means connected in said starting circuit for positively cutting off said starting fuel when said engine has started and said circuit is open, additional valve means responsive to manifold pressure and/or throttle plate position and disposed ahead of said solenoid valve means for positively cutting off said starting fuel and means for venting said starting fuel back to said tank to regulate the pressure thereof, and a second system for supplying fuel at all engine speeds after the engine has started, said second system including means adapted to supply fuel in accordance with air admitted to said engine.

6. A fuel supply system for a spark ignited internal combustion engine having an intake manifold and engine ignition and starting circuits, comprising a fuel storage tank, an electric pump connected in said ignition circuit for pumping fuel from said tank, a fuel control adapted to receive fuel from said pump and to supply said fuel to said engine, said control including a body member adapting said control to said manifold and having an air intake passage and a valve therein, a first fuel supply means adapted to supply fuel to said engine only during starting, said first means including thermostatically controlled valve means sensitive to engine temperature for supplying varying quantities of starting fuel to said engine dependent upon engine starting temperature, solenoid valve means connected in said starting circuit for positively cutting off said starting fuel when said engine has started and said circuit is open, and means for bypassing said starting fuel back to said tank to regulate the pressure thereof, and separate means for supplying fuel at all engine speeds after the engine has started, said separate means including means adapted to supply fuel in accordance with air admitted to the engine, valve means responsive to manifold pressure and/or throttle plate position and disposed ahead of said solenoid valve means for positively cutting off the flow of said starting fuel and means responsive to throttle opening movement for supplying acceleration fuel.

7. A fuel supply system for an internal combustion engine having an intake manifold and engine ignition and starting circuits, comprising a fuel storage tank, an electric pump connected in said ignition circuit for pumping fuel from said tank, a fuel control adapted to receive fuel from said pump and to supply said fuel to said engine, said control including a throttle body adapting said control to said manifold and having an intake passage and a throttle plate therein, first means for supplying starting fuel only to said engine, said first means including means for supplying varying quantities of starting fuel to said engine depending upon engine starting temperature, means connected in said starting circuit for positively cutting off said starting fuel when said engine has started and said circuit is open and means for regulating the pressure of said starting fuel, an idle air supply system, said idle air system including means for admitting varying quantities of additional fast idle air depending upon engine idling temperature, and separate means for supplying fuel at all engine speeds after the engine has started, said latter including means adapted to supply fuel in accordance with the quantity of air admitted to the engine.

8. A fuel supply system for a spark ignited internal combustion engine having an intake manifold and engine ignition and starting circuits, comprising a fuel storage tank, an electric pump connected in said ignition circuit for pumping fuel from said tank, a fuel control adapted to receive fuel from said pump and to supply said fuel to said engine, said control including a throttle body adapting said control to said manifold and having an intake passage and a throttle plate therein, a first starting fuel supply system, said first system including thermostatically controlled valve means for supplying varying quantities of starting fuel to said engine dependent upon engine starting temperature, solenoid valve means connected in said starting circuit for positively cutting off said starting fuel when said engine has started and said circuit is open, valve means responsive to manifold pressure and/or throttle plate position and disposed ahead of said solenoid valve means for positively cutting off the flow of fuel to said starting fuel system and means for venting said starting fuel back to said tank to regulate the pressure thereof, an idle air system, said idle air system including thermostatically controlled valve means for admitting varying quantities of additional fast idle air depending upon engine idling temperature, and a separate system for supplying fuel at all engine speeds after the engine has started, said latter system including means adapted to supply fuel in accordance with engine speed and manifold pressure and means responsive to throttle opening movement for supplying acceleration fuel.

9. A fuel control for an internal combustion engine having an intake manifold and a starting circuit, said control comprising a body adapting said control to said manifold, said body having an unrestricted air intake passage with a throttle valve and a fuel discharge nozzle therein, means responsive to engine requirements for supplying liquid fuel under a positive pressure to said nozzle at all conditions of engine operation after said engine has startred, and separate means sensitive to manifold pressure and engine temperature and being operative only during starting of said engine to supply liquid starting fuel to said engine.

10. A fuel control for an internal combustion engine having an intake manifold and means for starting said engine, said control comprising means responsive to engine speed and manifold vacuum for supplying fuel under a positive pressure at all conditions of engine operation after said engine has started, and means responsive to manifold pressure and engine temperature and being operative only at starting to supply starting fuel to said engine.

11. A fuel control for an internal combustion engine having an intake manifold and means for starting said engine, said control comprising first means responsive to engine speed and manifold vacuum for supplying fuel under a positive pressure at all conditions of engine operation after said engine has started, said first means being incapable of supplying fuel during starting of said engine, and second means sensitive to engine temperature for supplying varying quantities of starting fuel to said engine, said means being rendered inoperative after said engine has started.

12. A fuel control for an internal combustion engine having an intake manifold and means for starting said engine, said control comprising a body adapting said control to said manifold, said body having an air intake passage with a throttle plate and a fuel discharge nozzle therein, said passage being otherwise unrestricted, means responsive to engine requirements for supplying liquid fuel under a positive pressure to said nozzle at all conditions of engine operation, means sensitive to manifold pressure and engine temperature and being operative only at starting of said engine for supplying liquid starting fuel to said engine, and means responsive to engine temperature for supplying additional air to said engine during cold starting and cold idle and for shutting off said additional air when said engine is warm.

13. A fuel control device for an internal combustion engine having means for starting the same, said device comprising constant flow means for supplying liquid fuel under pressure at all conditions of engine operation, said means being responsive to engine speed and engine vacuum and having means for maintaining a predetermined fuel pressure, fuel pressure sensitive means for filling said device with fuel prior to starting said engine, separate means for providing fuel only for starting said engine, said means being responsive to engine vacuum and fuel pressure and said means being rendered inoperative when said engine is operating, and engine temperature sensitive means for controlling the quantity of said starting fuel.

14. A fuel control device for an internal combustion engine having an intake manifold and a starting system, said device comprising a fuel pump, a body having an intake passage, a throttle plate in said intake passage, a fuel discharge nozzle below said throttle plate, said nozzle being positioned to discharge fuel in a direction opposite to the flow of air through said intake passage, and a baffle member disposed in front of said nozzle to atomize the fuel discharged therefrom, and a positive-pressure constant-flow system for supplying liquid fuel to said engine at all conditions of engine operation, said system being responsive to engine speed and manifold vacuum and having means for maintaining a constant given fuel pressure, fuel pressure sensitive means for filling said device with fuel prior to starting said engine, separate means for providing fuel only for starting said engine, said separate means being responsive to manifold and fuel pressures and said means being rendered inoperative when said throttle plate is open, engine temperature sensitive means for controlling the quantity of said starting fuel, and means sensitive to engine temperature for admitting additional air for fast idle operation of said engine.

15. A fuel control for spark ignited internal combustion engines having an intake manifold and an engine starting system, said control comprising a body adapting said control to said manifold, said body having an air intake passage with a throttle plate disposed therein and a fuel nozzle below said throttle plate, turbulent flow means sensitive to engine speed and manifold pressure for supplying liquid fuel to said nozzle at all conditions of engine operation after said engine has started, means dependent upon fuel pressure and manifold pressure for causing said liquid fuel to bypass said nozzle during starting of said engine, said bypass means being positively rendered inoperative when said throttle plate is open regardless of manifold pressure, separate laminar flow means operative only during starting of said engine for supplying liquid starting fuel, and means for supplying additional air to said engine for fast idle after starting, said latter means both being controlled by thermostatic means sensitive to engine temperature.

16. A fuel control for internal combustion engines having a starting system and an intake manifold, said control comprising a body adapting said control to said manifold, said body having an air intake passage with a throttle plate disposed therein and a fuel nozzle discharging below said throttle plate, constant flow means sensitive to engine speed and manifold pressure for supplying liquid fuel at a relatively high pressure to said nozzle at all conditions of engine operation after said engine has started, means dependent upon fuel pressure and manifold pressure for causing said liquid fuel to bypass said nozzle during starting of said engine, said bypass means being positively rendered inoperative when said throttle plate is open regardless of manifold pressure, and means operative only during starting of said engine to supply varying quantities of liquid starting fuel at a relatively low pressure, said latter means being controlled by thermostatic means sensitive to engine temperature.

17. A fuel control for internal combustion engines having starting means and an intake manifold, said control comprising a body adapting said control to said manifold, said body having an air intake passage with a valve disposed therein and a fuel nozzle discharging below said valve, means sensitive to engine speed and manifold pressure for supplying liquid fuel at a relatively high positive pressure to said nozzle at all conditions of engine operation only after said engine has started, means dependent upon fuel pressure and manifold pressure for causing said liquid fuel to bypass said nozzle during starting of said engine, said bypass means being positively rendered inoperative when said valve is open regardless of manifold pressure, means effective only during starting of said engine to supply varying quantities of liquid starting fuel at a relatively low positive pressure, said latter means being controlled by thermostatic means sensitive to engine temperature.

18. A fuel control for an internal combustion engine having starting means and an intake manifold, said control comprising a body adapting said control to said manifold, said body having an otherwise unrestricted air intake passage with a throttle valve therein and a fuel discharge nozzle below said throttle valve, means sensitive to engine speed and manifold pressure for supplying liquid fuel under a positive pressure to said nozzle at all conditions of engine operation after said engine has started, said means having means for maintaining said fuel pressure constant, additional means sensitive to fuel and manifold pressures and to engine temperature and being operative only at starting for supplying liquid starting fuel to said engine, means responsive to engine temperature for supplying additional air to said engine during starting and cold idle and for shutting off said additional air when said engine is warm, and means responsive to opening movements of said throttle plate for supplying acceleration fuel to said nozzle.

19. A fuel control device for an internal combustion engine having starting means and an intake manifold, said device comprising a throttle body having an air induction passage communicating with said intake manifold, a throttle valve controlling the flow of air through said induction passage, engine speed responsive fuel metering means adapted to deliver fuel under pressure to said intake manifold posterior to said throttle valve after the engine has started, means controlled by temperature for at times admitting additional air to said manifold, solenoid operated means controlled by temperature for supplying varying quantities of fuel only during starting of said engine, and means controlled by throttle valve position for cutting off the flow of said starting fuel when said throttle valve is opened.

20. A fuel control device for an internal combustion engine having starting means and an intake manifold, said device comprising a throttle body having an air induction passage communicating with said intake manifold, a throttle valve controlling the flow of air through said induction passage, manifold vacuum responsive fuel metering means adapted to deliver fuel under pressure to said intake manifold posterior to said throttle valve, temperature responsive means influencing the amount of metered fuel delivered by said metering means, means controlled by temperature for at times admitting additional air to said manifold, and solenoid operated means connected with said starting means and controlled by temperature for supplying varying quantities of fuel only during starting of said engine.

21. A fuel control device for an internal combustion engine having starting means and an intake manifold, said device comprising a throttle body having an air induction passage communicating with said intake manifold, a throttle valve controlling the flow of air through said induction passage, fuel metering means adapted to deliver fuel under pressure to said intake manifold posterior to said throttle valve after said engine has started, temperature responsive means influencing the amount of metered fuel delivered by said metering means until said engine reaches operating temperature, means controlled by temperature for at times admitting additional air to said manifold, solenoid operated means controlled by temperature for supplying varying quantities of additional fuel only during starting of said engine, and means responsive to engine speed for varying the amount of fuel delivered by said metering means per unit of time.

22. A fuel control device for an internal combustion engine having starting means and an intake manifold, said control comprising a throttle body having an induction passage communicating with said intake manifold, a throttle valve controlling the flow through said induction passage, fuel metering means adapted to deliver fuel under pressure to said intake manifold posterior to said throttle valve, a pump for supplying fuel under pressure to said metering means, temperature responsive means adapted to at times vary the amount of metered fuel delivered by said metering means, means controlled by temperature for at times admitting additional air to said manifold, solenoid operated means controlled by temperature for supplying varying quantities of fuel during starting of said engine, and means controlled by throttle valve position for cutting off the flow of said starting fuel when said throttle valve is opened.

23. A fuel control device for an internal combustion engine having an engine starter, an electrical starter circuit and an intake manifold, said device comprising a throttle body having an air induction passage communicating with said intake manifold, a throttle valve controlling the flow of air through said induction passage, a fuel metering means adapted to deliver fuel under pressure to said intake manifold posterior to said throttle valve, means controlled by temperature for at times admitting additional air to said manifold, solenoid controlled means influenced by engine temperature for supplying varying quantities of additional fuel during starting of said engine, said solenoid being electrically connected with said engine starter circuit and adapted to be rendered inoperative when said engine becomes self-sustaining.

24. A fuel control device for an internal combustion engine having a starter circuit and an intake manifold, said device comprising a throttle body having an air induction passage communicating with said intake manifold, a throttle valve controlling the flow of air through said induction passage, fuel metering means adapted to deliver fuel under pressure to said intake manifold posterior to said throttle valve, means responsive to manifold pressure for influencing the amount of metered fuel delivered by said metering means, means controlled by temperature for at times admitting additional air to said manifold, solenoid operated means connected with said starter circuit for supplying varying quantities of fuel only during starting of said engine, means responsive to engine speed for varying the amount of fuel delivered by said metering means per unit of time, and means for at times recirculating said fuel.

25. A fuel control for an internal combustion engine having starting means and an intake manifold, said control comprising a body adapting said control to said manifold, said body having an air intake passage controlled by a throttle valve, main metering means responsive to engine requirements for supplying fuel under positive pressure to said intake manifold below said throttle valve, separate means sensitive to engine temperature and manifold pressure for supplying fuel only during engine starting, additional means also responsive to engine temperature for admitting additional air to said engine during starting and cold idle, and means responsive to a pressure dependent upon manifold pressure value for supplying varying quantities of additional fuel to said engine during cold idle operation.

26. The invention as defined in claim 25, wherein the value of said dependent pressure is influenced by temperature responsive means.

27. A fuel control for an internal combustion engine having starting means and an intake manifold, said control comprising first means responsive to engine speed and manifold vacuum for supplying fuel under a positive pressure at all conditions of engine operation except starting after said engine has started, second means sensitive to engine temperature and being rendered inoperative after said engine has started for supplying varying quantities of starting fuel to said engine, and additional means sensitive to a pressure dependent on manifold pressure for supplying varying quantities of additional fuel to said engine during cold engine operation.

References Cited in the file of this patent

UNITED STATES PATENTS

| Number | Name | Date |
|---|---|---|
| 1,848,255 | Kreher | Mar. 8, 1932 |
| 1,971,494 | Lesage | Aug. 28, 1934 |
| 2,292,071 | Haibe | Aug. 4, 1942 |
| 2,390,658 | Mock | Dec. 11, 1945 |
| 2,415,668 | Barabino | Feb. 11, 1947 |
| 2,427,793 | Lee | Sept. 23, 1947 |
| 2,495,299 | Tarter | Jan. 24, 1950 |
| 2,518,712 | Ovens | Aug. 15, 1950 |
| 2,592,945 | Odell | Apr. 15, 1952 |
| 2,600,368 | Winkler | June 10, 1952 |
| 2,665,671 | Volz et al. | Jan. 12, 1954 |
| 2,674,986 | Schweiss | Apr. 13, 1954 |
| 2,715,522 | Carlson et al. | Aug. 16, 1955 |
| 2,788,082 | Vanderpoel | Apr. 9, 1957 |
| 2,828,115 | Register | Mar. 25, 1958 |
| 2,873,956 | Zubaty | Feb. 17, 1959 |